United States Patent [19]

Myrmo et al.

[11] Patent Number: 4,485,438

[45] Date of Patent: Nov. 27, 1984

[54] HIGH TRANSFER RATE BETWEEN MULTI-PROCESSOR UNITS

[76] Inventors: Erik R. Myrmo; Michael F. Wells, both of 7290 Engineer Rd. #F, San Diego, Calif. 92111

[21] Appl. No.: 393,008

[22] Filed: Jun. 28, 1982

[51] Int. Cl.³ .............................................. G06F 15/16
[52] U.S. Cl. .................................................... 364/200
[58] Field of Search .................... 340/200 MS File

[56] References Cited

U.S. PATENT DOCUMENTS

| | | | |
|---|---|---|---|
| 3,566,364 | 2/1971 | Hauck | 364/900 |
| 3,787,820 | 1/1974 | Sherman | 364/900 |
| 3,820,085 | 6/1974 | Zelinski | 364/900 |
| 3,922,644 | 11/1975 | Borbas et al. | 364/200 |
| 3,965,458 | 6/1976 | Borbas et al. | 364/900 |
| 4,047,157 | 9/1977 | Jenkins | 364/900 |
| 4,099,028 | 7/1978 | Towson | 179/15 BA |
| 4,197,588 | 4/1980 | Cason | 364/900 |
| 4,198,681 | 4/1980 | Furr, Jr. | 364/900 |
| 4,417,304 | 11/1983 | Dinwiddie, Jr. | 364/200 |

FOREIGN PATENT DOCUMENTS 998152 6/1974 Canada .

OTHER PUBLICATIONS

Intel, Section 2, "Functional Description," pp. 2-1 to 2-17.
Intel, Section 5, "Design Guidelines and System Applications," pp. 5-1 to 5-32.

*Primary Examiner*—Raulfe B. Zache
*Attorney, Agent, or Firm*—Charmasson & Holz

[57] ABSTRACT

In the operation of a network of data processing units, a method and apparatus for transferring information between units in a multi-processor environment at high throughput rates.

The high throughput rates are achieved by concurrent send/receive direct-memory-access transfers between buffer memories associated with each unit. The invention provides for direct-memory-access (DMA) transfers between a buffer memory and the data port of the sending unit and direct-memory-access transfers between this data port and the buffer memory of the receiving unit; thus eliminating shared-memory resource allocation, memory access arbitration and other programmed operations which normally require execution of several instructions by each unit's processor for each transfer.

Each unit interfaces with the system bus through a message transfer facility which groups the buffer memory, the output data port, an attention identification register, resident traffic control DMA and data processors and optional miscellaneous function expansion.

Each message transfer is initiated by the sending unit placing on the system bus the address of the targeted receiving unit attention identification register, and the sending unit unique identification. The receiving unit, upon recognizing the identification code in its attention register, initiates the direct-memory-access transfer.

14 Claims, 6 Drawing Figures

HIGH TRANSFER RATE BETWEEN MULTI-PROCESSOR UNITS

FIELD OF THE INVENTION

The instant invention relates to data processing and more particularly to data transfers between devices and their bus architecture and traffic control protocols.

BACKGROUND OF THE INVENTION

The current evolution of data processing tends towards the grouping of various intelligent devices such as mini-processors and micro-processors into an integrated system wherein several processors and their peripherals are linked by way of common bus lines.

Often the need arises to have messages passed between devices as tasks on different units require parameters, results, buffers, etc. from one another. For example, a task may require access to a file from a mass memory. The device controlling the mass memory is asked by the requesting unit to provide the file. Once the file is retrieved it is sent by the controlling device to the requesting unit. This message passing between devices over a common bus must be controlled in an orderly fashion, since several devices may concurrently require access to the services of other devices. Assignment of priorities and various traffic protocols need to be implemented.

The efficiency of such multi-processor systems with concurrent processing requirements is often limited by the data throughput capability of the bus. The response time of a system is often severely affected by the time devoted by the controlling device to the processing of programmed data transfers over the bus. Such transfers ordinarily require the execution by the controlling device of several instructions for each word of transferred data.

Consequently, under current practices, the connection of additional components to a bussed network, and especially the addition of intelligent units, results in a substantial reduction in the overall system response.

In order to effectively utilize the full bandwidth of a bus system, the participating device should maximize processing without centralized bus traffic management and allow maximum independent concurrent processing and data exchange.

A more efficient bus data transfer would not only allow the interconnection of more units to a common bus, but would also permit the interconnection of two or more independent bus networks through an intelligent unit having access to the various bus systems, without significant effect on the response time of either system.

SUMMARY OF THE INVENTION

The principal object of this invention is to expand the throughput rate attainable in a multi-processor environment.

Another object of this invention is to make maximum utilization of bus bandwidth by minimizing programmed message transfers.

A further object of this invention is to provide bus interface modules with high-throughput message passing hardware and firmware.

It is also an object of this invention to provide an efficient message transfer protocol which allows direct and self-managed transfer of information between devices.

These and other objects are achieved by allowing concurrent send/receive message transfers through direct-memory-access between devices, as will be made evident through the following description of the preferred embodiment of the invention.

DETAILED DESCRIPTION OF THE PREFERRED EMBODIMENT

Figure 1:
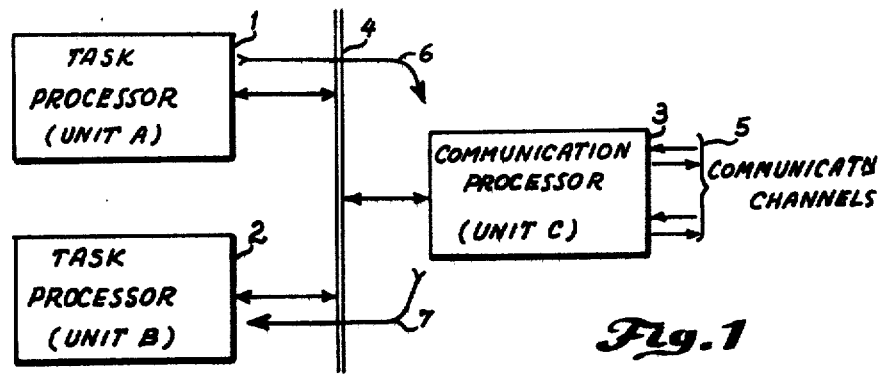
FIG. 1 is the general block diagram of a multi-processor bussed system embodying the invention.

Referring now to the drawings, the preferred embodiment of the invention will be described in the context of a multi-processor system illustrated in the block diagram of FIG. 1. The system comprises a first task processor (Unit A) 1, a second task processor (Unit B) 2 and an intelligent communication processor (Unit C) 3 which are interconnected by means of a system bus 4. The communication processor 3 accesses of series of communication channels 5. The invention will be described in conjunction with the simultaneous transfer of data between Unit A and the communication processor 3 as indicated by arrow 6 and between the communication processor 3 and Unit B as indicated by arrow 7; both transfers taking place through the system bus 4. The task processors 1 and 2 could represent any type of intelligent data processing device designed to operate in conjunction with other intelligent devices and peripheral units through a common system bus. The communication processor is an intelligent peripheral unit which can provide and control access to a plurality of communication channels 5 for any device connected to the system bus 4. The system bus 4 is implemented according to well known techniques to provide memory and I/O data transfer, generation of interrupts, bus exchange priority techniques and orderly traffic control between the various units connected to it. A typical example of such system bus is disclosed in a copyrighted publication of the INTEL Corporation of Santa Clara, Calif. entitled INTEL MULTI BUS SPECIFICATION Manual Order No. 9800683-02. The invention, however, is not limited to any particular type of system bus and could be applied to various types of bussed systems as will become evident through the following disclosure.

Figure 2:
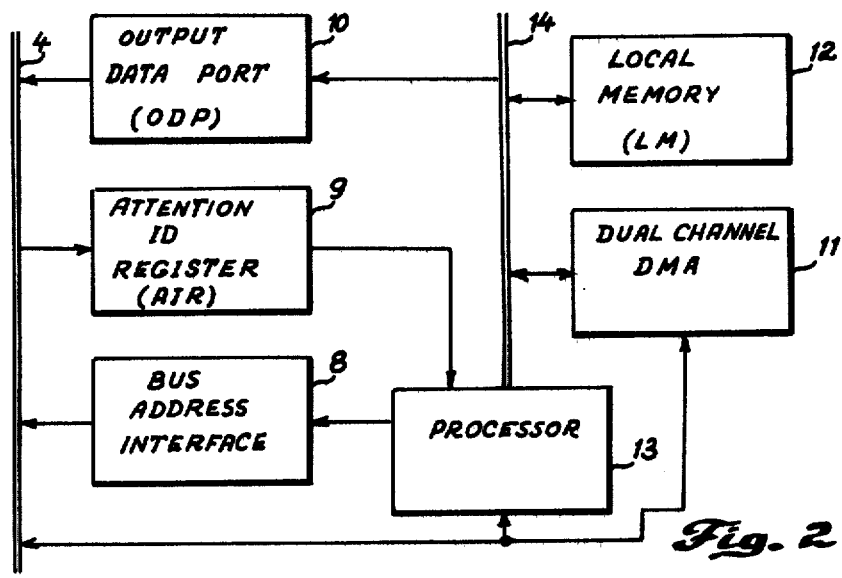
FIG. 2 is the general block diagram illustrating the bus interface and message handling functions found in each unit of the bussed system.

In the system, the part of each unit which interfaces with the system bus 4 is implemented according to a particular architecture which is generally described in the block diagram of FIG. 2.

Each unit is provided with a dual channel Direct Memory Access (DMA) controller 11 which provides for direct access to the local memory 12 without requiring the continuous attention of a central processor for the transfer of data. This type of DMA controller usually includes a processing facility and constitutes a standard component of many modern data processing machines. DMA operation is well known to those skilled in the art. In the drawing, the processor block 13 may represent the general task processor device and all its associated hardware and firmware. The processor 13 controls the operation of the resident bus 14 through which it communicates with, amongst other devices, the local memory 12 and an output data port 10 connected to the system bus 4. The DMA controller 11 provides for the direct writing of data gathered on the system bus 4 into the local memory 12. It also provides for reading data directly from the local memory 12 into the output data port 10. The bus interface also includes an attention register 9 of the FIFO type capable of storing the identification code of several devices which, through the system bus 4, seek to access the unit. The attention register of another unit connected to the system bus 4 can be accessed by placing its address on the system bus through the target bus address interface 8.

Figure 3:
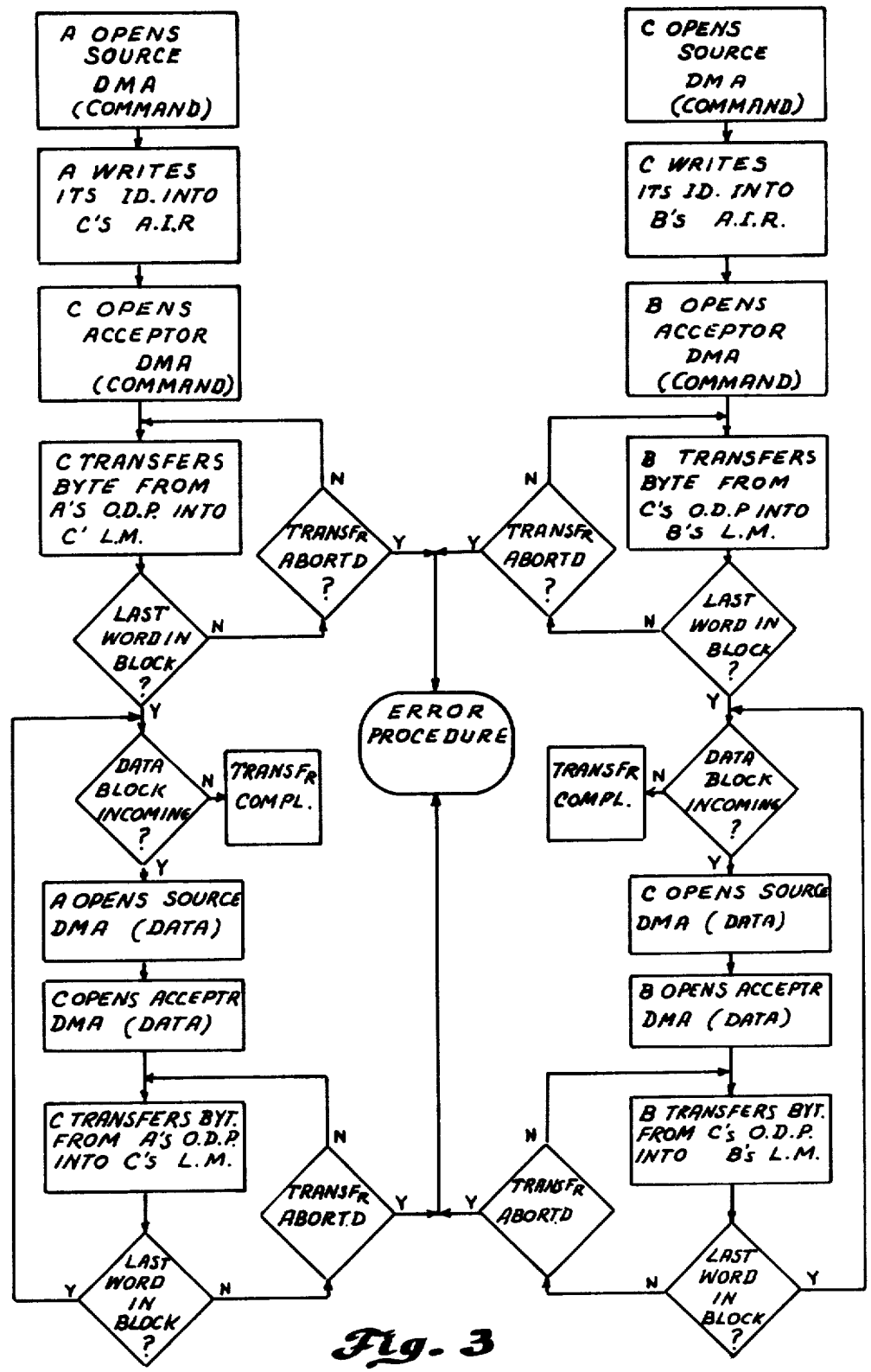
FIG. 3 is a message transfer flow diagram.
Figure 4:
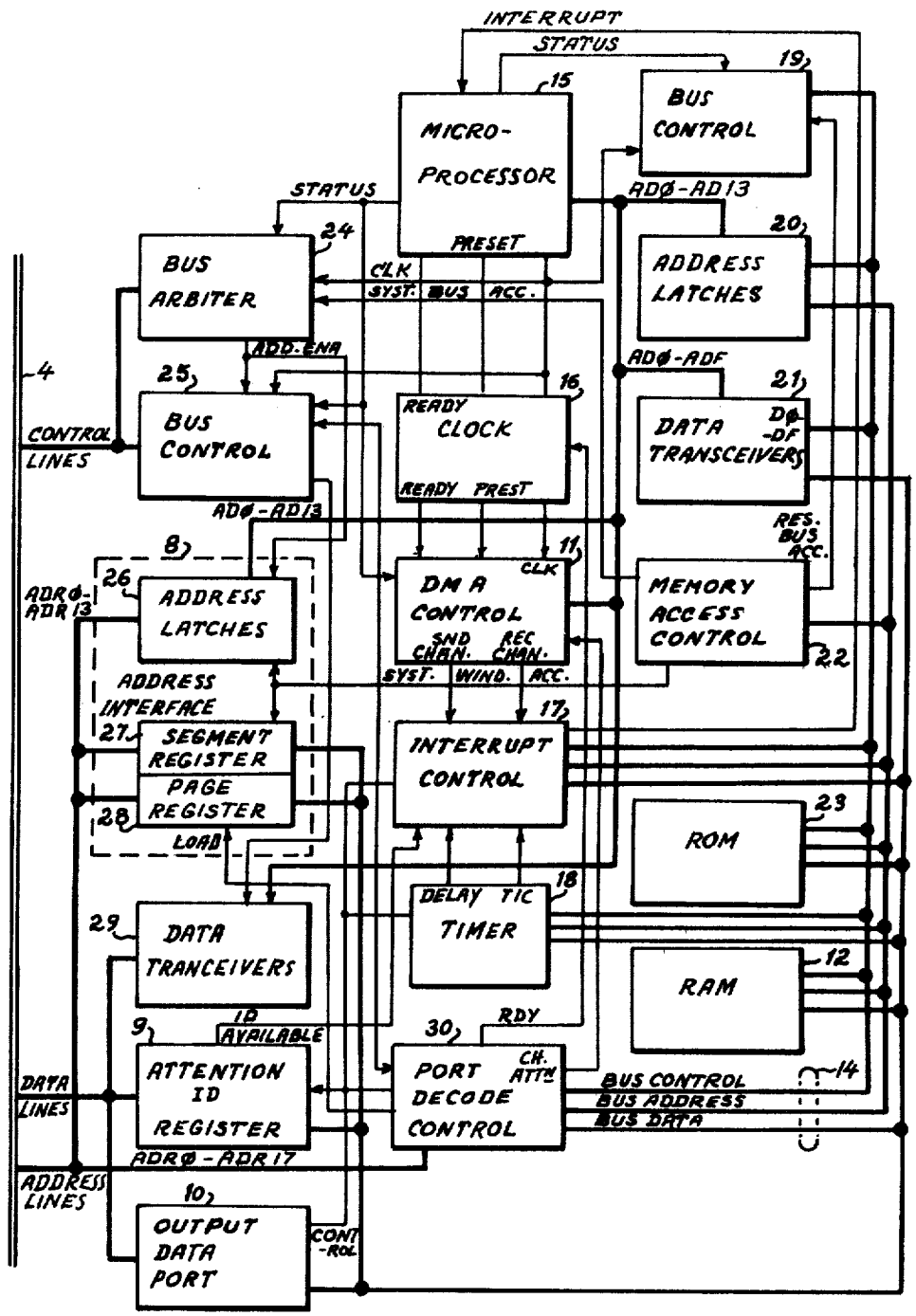
FIG. 4 is the expanded block diagram of each unit.

Working in conjunction with the hardware architecture outlined above, is an inter-unit message transfer protocol which will now be described in reference to the example of FIG. 1, the flow diagram of FIG. 3 and FIG. 4.

This protocol follows the following general rules:
All transfers are initiated by the source unit.
All messages consist of an attention block and an optional data block or data blocks.
Each block is transferred in a separate DMA operation.
A unit can request only one transfer at a time to a single other unit.
The system bus access for a message transfer is performed by the acceptor unit.

Accordingly, when Unit A is ready to send data to the communication processor 3, it gains control of the system bus 4 as soon as the prioritized bus arbitration sequence allows it do so; and writes its identification code through the system bus 4 into the attention register 9 of the communication processor 3. The loading of the attention register 9 interrupts the micro-processor 15. The contents of the register are analyzed. The communication processor then realizes that data is to be received from task processor A, which prompts the communication processor to initialize an acceptor DMA channel for the transfer of information between the output data port 10 of Unit A directly into the communication processor's memory 12. In the meantime, Unit A has initiated a source DMA channel for the transfer of a message from its local memory 12 into its output data port 10. The initiation of such DMA channel transfers follow standard procedures well known to those skilled in the computer programming arts.

Since the transfer of data from the communication processor 3 to Unit B is to take place simultaneously with the transfer between Unit A and the communication processor 3, the communication processor must, after having gained control of the system bus 4, write its unique identification into the attention register 9 of Unit B. Unit B then initiates an acceptor DMA channel for the transfer of information from the communication processor output data port 10 directly into its local memory 12. The communication processor has also initiated a source DMA channel for the transfer of data from its local memory 12 into its output data port 10.

It should be understood that the access to the system bus is controlled by the priority status of the various concurring units. In general, a device is allowed to gain control of the system bus 4 if no higher priority devices currently have control. When a device releases control of the bus, the highest priority requesting device gains control. Bus control can be relinquished by a unit between word transfers if needed in order to allow a higher priority unit to take over control.

The actual transfer of data begins with the communication processor 3 gaining control of the system bus 4 and causing the transfer of the first word made of one or more bytes in the message from the output data port of the task processor A to the communication processor's local memory be means of a I/O READ system bus transfer. The strobe signal which reads the first word out of Unit A's output data port is also used to synchronize the DMA transfer of the next word into the output data port. It should be noted that a transfer acknowledgement signal is only generated on the bus when reading a new word out of the source unit's output data port. This insures that the acceptor unit will never get ahead of the source device in the message transfer. However, it would be very unusual for this to happen as the source unit can replenish the output data port from local memory faster than the acceptor unit can finish reading the word and make an attempt to read the next one. The source DMA channel in Unit A and the acceptor DMA channel in the communication processor will continue to transfer words between their respective local memories, possibly losing and gaining control over the system bus 4 during the transfer, until the first block of data has been transferred. This first block called Attention Block contains number and word count of any following data blocks.

A similar operation takes place between the communication processor 3 and Unit B which after taking control of the system bus 4 transfers the first word of data from the communications processor's output data port into the local memory of Unit B.

The Attention Block received by the communication processor 3 is decoded to determine whether data blocks are to be transmitted; and, if so, to determine the number of blocks and each block length. The Attention Block may, instead of or in addition to data block information, contain other instructions for the acceptor device which will be decoded and executed by the communication processor 3. Similarly, the Attention Block sent by the communication processor to Unit B is analyzed to determine if data has to be transferred or other functions must be executed by Unit B. The quasi-simultaneous transfers 6 and 7 are interweaved on the system bus in accordance with the bus access priority status of the communication processor 3 and Unit B. The source and acceptor DMA channels are normally terminated in accordance with the specified word count. If a block DMA transfer is terminated by a condition other than a word count, the message transfer is presumed to be not complete. When the acceptor device detects the error condition it must request a message transfer to the source unit to indicate that the data has not been received. If the source unit senses an error condition it must address the acceptor unit in order to renew the message transmission. At the end of the first data transfer the communication processor sends the data over the specified communication channel. At the end of the second data transfer the task processor processes the data received from the communication processor.

The architecture of the bus interface and message handling section of each unit will now be discussed in more detail with reference to the block diagram of FIG.

4. Each unit is controlled by a general purpose microprocessor 15 which may be the actual task processor A or B shown in FIG. 1, or may be a special processor dedicated to the control of the data transfer and provided in addition to the device used as Unit A or B. The micro-processor 15 is supported by a series of standard modules usually associated with a micro-processor such as a clock control module 16, and interrupt controller module 17 and associated timer module 18, a bus control module 19, an address latches module 20, a data transceivers module 21, and a read-only memory subsystem 23. The read-only memory subsystem 23 holds the micro-program necessary for the operation of the micro-processor 15. A resident bus 14 links the various modules together, and provides access to the local memory 12 constituted by a random access memory subsystem. A second series of standard modules providing the interface and control of the system bus 4 comprises a bus arbiter module 24, a bus control module 25, bus address latches 26, and a data transceivers module 29. The micro-processor data lines are connected to two modules: a segment register 27 and a page register 28 which along with the address latches 26 constitute the system bus address interface. They are controlled from the memory access control module 22 and a port control module 30. All modules except the port control module 30 and the access control module 22 are constituted by standard logic packages with schematics and operations are well documented in the published data processing literature.

The micro-processor 15 controls access to the read-only memory 23 and the ramdom access memory 12 both residing on the resident bus 14 as well as off-board memory space through the system bus 4. The traditional method for communicating to an off-board memory consists of addressing it as one that is not explicitly decoded as an on-board one. This means that the full address range is divided between on-board and off-board mapping. This tends to limit large system implementations. The invention uses a page/segment register method which provides access to a full sixteen megabyte multi-bus address range in sixty-four kilobyte segments. In many applications this provides a powerful tool with negligible impact on user programming. The segment register 27 and page register 28 are loaded by a resident bus I/O output operation. The high-order four bits determine one of sixteen one-megabyte pages being accessed, while the lower four bits determine one of sixteen segments of sixty-four kilobytes each within the page. The system bus is then accessed through a special sixty-four kilobyte window in the off-board memory address space. Address bits ADR10 through ADR17 are gated onto the system bus through the segment register 27 and the page register 28; while address bits ADR0-ADRF are supplied directly from the on-board processor address buffers. When access is sought across the segment boundary the next page/segment register address must be entered under software control. The memory access control module 22 decodes the memory access instruction and provides a resident bus access, general system bus access or page/segment system bus access enabling signal.

Figure 5:
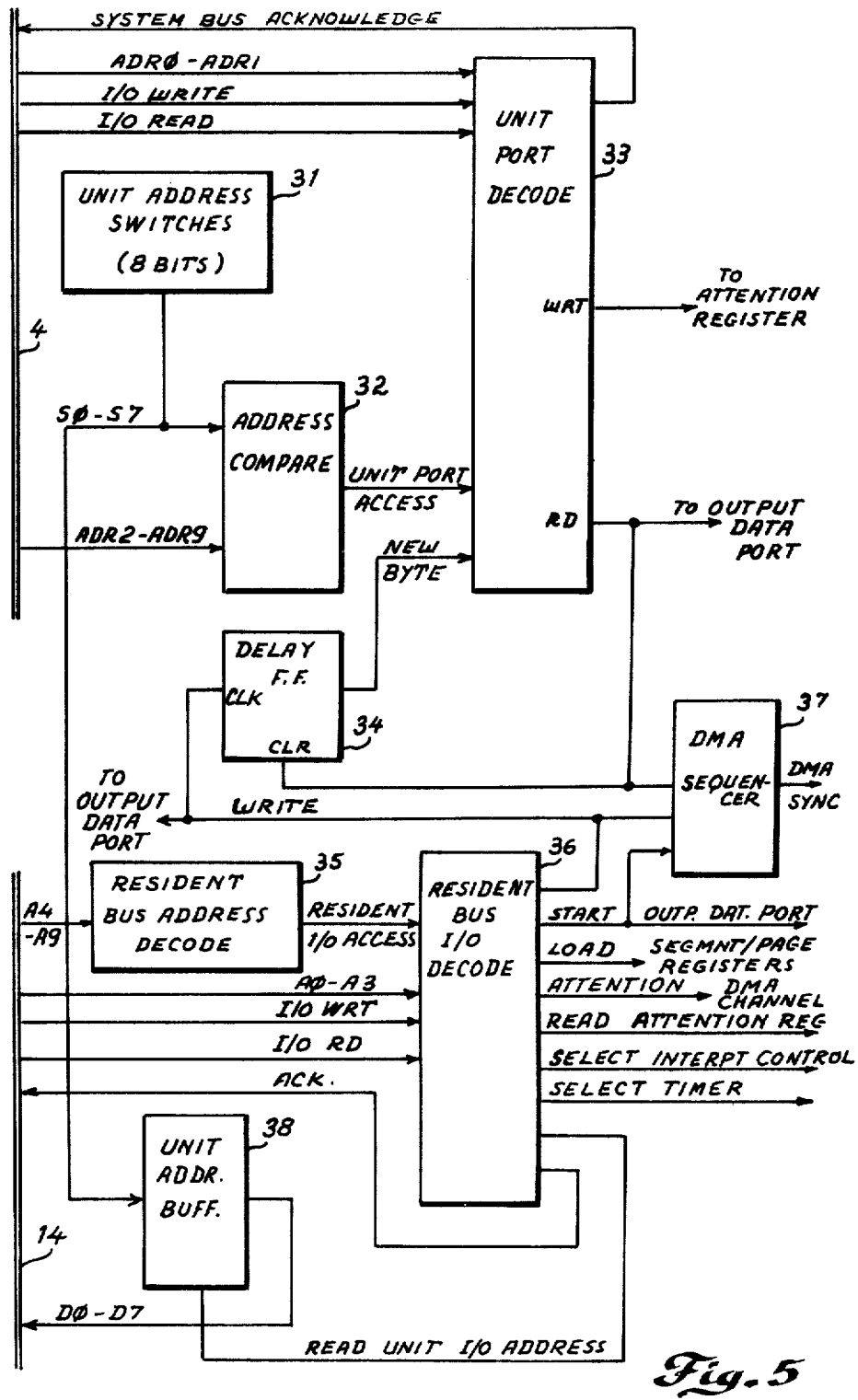
FIG. 5 is the general block diagram of the port control module found in each unit.

The organization of the port control module 30 will now be described in reference to the block diagram of FIG. 5. Each unit is provided with a set of address switches 31 on which the user dials the particular eight-bit address assigned to the unit. When convenient to do so, it has been found practical to give to each unit the same address as its identification code. The address switch output lines S0-S7 are compared to the third through tenth address lines on the system bus 4 by the address compare module 32. The address compare module 32 upon coincidence generates a unit access signal to enable the operation of the unit port decode module 33. The unit port decode module 33 also receives the two least significant bits of the address line from the system bus 4 which are made available to the programmer for eventual system expansion. The unit port decode module 33 decodes the bus I/O read command and I/O write command and generates a write command for the attention register 9, a system bus acknowledgement signal, and a read command for the output data port 10. The acknowledgement and read port signal, however, will not be generated until the new word signal is applied to the unit port decode module 33. This new word signal is provided by a flip-flop 34 from the occurrence of a write output data port signal in the eventuality that it takes more time to execute a DMA source transfer from local memory 12 to output data port 10 than it takes the acceptor unit to execute a DMA transfer from the source data port to the acceptor local memory.

The micro-processor address lines are decoded in the resident bus address decode module 35 which provides a resident access signal to enable the resident bus I/O decode module 36. This module also receives the I/O read and I/O write commands from the resident bus 14. The resident bus I/O decode module 36 provides control signals to load the segment/page registers 27, 28; initiate a DMA channel; read the attention ID register 9; write into the output data port 10; access the interrupt controller 17; select a function in the timer module 18; initialize the output data port; provide a resident bus acknowledge signal; and reads the unit I/O address. The output data port initializing signal is provided to the DMA sequencer module 37 which in combination with the read and write output data port commands generates the synchronization signal necessary to drive the DMA controller.

Figure 6:
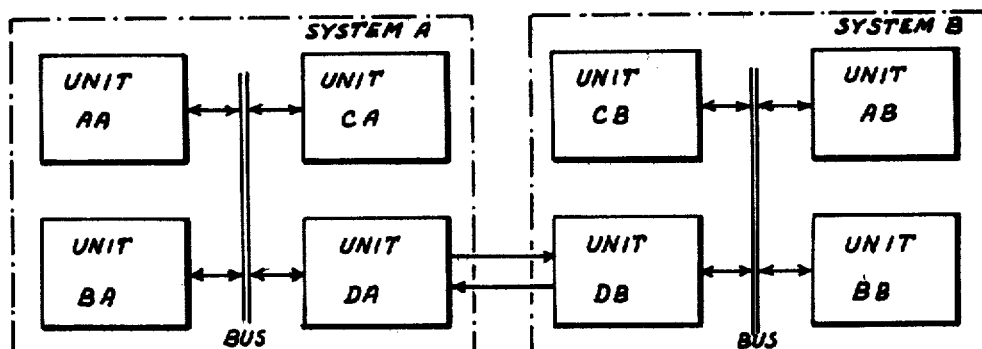
FIG. 6 is the general block diagram of an expanded system grouping two bussed networks of independent processors.

The unit address which is set on the switch module 31 is input into a buffer module 38 and presented to the resident bus 14 on data lines line D0-D7. This feature allows the micro-processor 15 to read the unit address when the power is first turned on. In the preferred embodiment of the invention each unit on the system bus 4 is programmed to call sequentially all unit address codes in order to determine which unit is actually in the system, and whether single-byte word transfers are supported. This procedure greatly simplifies the task of the programmer and the system user by precluding the writing into the unit memory a list of the system components. It is suffice to reset the system anytime one of the unit addresses is changed or whenever an intelligent unit is added to, or deleted from, the system. FIG. 6 illustrates the application of the invention to message transfers between two independent systems. Each system follows the general configuration of the system described earlier and groups various intelligent units around a system bus. One unit, however, in each system, Unit DA in System A and Unit DB in System B are equipped with a second set of interface and data handling hardware and are interconnected through a dedicated channel or a third bus system. Assuming that Unit BA from System A wants to transfer a message to Unit BB in System B, it must first transmit the message to Unit DA specifying in its attention block the ultimate destination of the message. Unit DA upon decoding the attention block initiates a transfer of the message to Unit DB across the dedicated channel. Unit DB upon learning that the message is to be transmitted to Unit BB within System B requests a transfer to Unit BB across the System B bus. Several networks of bussed systems can thus be linked and message transfers can be effected without burdening the program.

While the preferred embodiment of the invention has been described and various applications have been suggested, it should be understood that other implementations can be devised and modifications made to the described structure without departing from the spirit of the invention and within the scope of the appended claims.

What is claimed is:

1. In a network of data processing equipment, wherein transfers of information take place between memories of at least two units communicating over a common system bus, an apparatus for expediting said transfer which comprises:

means for recognizing an attention request message from another unit;

an ouput data port;

means for causing the transmitting unit to place on the bus an attention request message addressed to the receiving unit;

means for effecting a source direct-memory-access channel operation for the transfer of information between a local memory and the output data port of the transmitting unit;

means, responsive to said means for recognizing, for causing the receiving unit to effect an acceptor direct-memory-access channel operation between the output data port of the transmitting unit and a local memory of the receiving unit across said system bus in synchronization with said source direct-memory-access channel operation; and wherein one of said means for effecting and one of said means for causing reside together on a first unit and comprise:

means for receiving a first batch of information from a second unit while a second batch of information is being sent, the transfer of said batches taking place concurrently over the system bus.

2. The apparatus claimed in claim 1 wherein each unit comprises a prioritized means for acquiring control over the system bus.

3. The apparatus claimed in claim 2 wherein said means for causing the transmitting unit to place on the bus an attention request message comprises:

means for generating an attention request message, said message including means for identifying the transmitting unit, and means for addressing the receiving unit.

4. The apparatus claimed in claim 3 wherein said means for recognizing an attention request message comprises:

means for detecting the address of the receiving unit; and means, responsive to said means for detecting, for recognizing the identification of the transmitting unit.

5. The apparatus claimed in claim 4 wherein each unit identification code is the same as its address on the system bus.

6. The apparatus claimed in claim 1 wherein each of said batches of information comprise an attention block including:

means for indicating the presence and length of a following data block.

7. The apparatus claimed in claim 6 wherein each receiving unit terminates its acceptor direct-memory-access channel operation in response to the block length indicated by the attention block.

8. The apparatus claimed in claim 1 wherein each unit comprises:

a programmable micro-processor controlling the operation of said means;

a plurality of logic modules associated with said micro-processor; and an internal bus between said micro-processor and said modules.

9. The apparatus claimed in claim 8 wherein said means for identifying the transmitting unit comprise:

a bank of switches for setting thereon the unit identification code; and means for causing the micro-processor to read said switches upon reset of the unit.

10. The apparatus claimed in claim 8 wherein the modules comprise means for translating data appearing on said internal bus into system bus addresses.

11. The apparatus claimed in claim 10 wherein said means for translating comprise:

at least one register connected to a first fraction of the system bus address lines;

means for loading said register by a programmed output operation of the micro-processor; and means for applying internal bus addresses to a second fraction of the system bus address lines.

12. The apparatus claimed in claim 11 wherein said register holds the most significant bits of the system bus address and said means for applying operates on the least significant bits of the system bus address.

13. The apparatus claimed in claim 1 wherein at least one unit comprises means for accessing at least two other units, said other units residing into separate bussed networks of data processing equipment.

14. The apparatus claimed in claim 1 wherein each transfer of information is initiated by the transmitting unit.

* * * * *